July 7, 1942.   S. K. WELLMAN   2,289,311
COMPOSITE BLANK AND METHOD OF SHAPING
Filed March 6, 1940

INVENTOR
SAMUEL K. WELLMAN
BY G. G. Christensen
ATTORNEY

Patented July 7, 1942

2,289,311

UNITED STATES PATENT OFFICE 2,289,311

COMPOSITE BLANK AND METHOD OF SHAPING

Samuel K. Wellman, Cleveland Heights, Ohio, assignor to The S. K. Wellman Company, Cleveland, Ohio, a corporation of Ohio Application March 6, 1940, Serial No. 322,543

9 Claims. (Cl. 29—189)

This invention relates to a method for shaping a composite article which is composed of a sintered lamina bonded to a metallic backing or reinforcing member. It relates especially to a method for bending such an article when the sintered metal lamina is to occur on the convex surface of the backing member.

It is an object of the invention to provide a method by which laminated articles of the class described may be bent, curved or otherwise formed to a desired shape without cracking the sintered lamina. Another object is to provide a novel assembly particularly adapted for use in the method.

Difficulty has been encountered in the past in bending or curving composite articles which comprise a layer of sintered metal bonded to a metallic backing member. Due probably to the lack of adequate ductility in the sintered material, composite articles of the class described generally develop cracks in the sintered layer when bent by the usual methods, and especially when bent with the sintered lamina on the convex face of the backing member. The cracking which is referred to here is especially objectionable since it weakens the bond between the sintered material and the backing member, and in addition produces an article which is unmerchantable by reason either of its defective appearance or its inferior performance under service conditions. The latter disadvantage is particularly objectionable in friction or anti-friction articles such as bearings, brake linings or clutch facings.

Attempts have been made in the past to avoid cracking by slotting the sintered material, or by otherwise breaking up its continuity. For example, in bending a brake strip for use in internal expanding brakes wherein the sintered layer is disposed on the convex surface of the backing member, cracking has been avoided to some extent by slotting the sintered material transversely at intervals along the length of the strip, the slots extending the full width of the strip and extending through the lamina to the backing member. When slotted in this manner, the brake strip may be bent approximately to the desired curvature without cracking if the slots are provided at sufficiently short intervals. Even when this expedient is used, however, it has been found that the composite strip cannot be shaped accurately enough to give it a uniform curvature since the backing member tends to bend more in the locality of the slots than in the spaces between the slots. The outer surface of such a brake strip consequently consists of a plurality of nearly flat blocks of sintered material joined together by the backing member in such manner as to approach in effect a curved surface. When such a brake strip is put into service, it becomes necessary to wear away the transverse edges of each of the blocks until the whole surface of each one comes into contact with the brake drum. It will consequently be apparent that such a brake strip requires considerable attention during its wearing-in period since frequent adjustment is required to maintain the brake in proper working condition.

In order to avoid the foregoing disadvantages which result from cracking or from the expedients resorted to for the purpose of minimizing cracking, recourse is had to a method by means of which the composite article may be bent or curved precisely to the desired curvature without the formation of cracks within the sintered layer. The basis for the invention lies in the discovery that if the sintered lamina is suitably reinforced by means of reinforcing members bonded to its opposite faces to form a three-layer assembly, the assembly may be given a high degree of curvature without developing cracks in the sintered material. After the 3-layer assembly has been bent, the desired two-layer composite assembly may be obtained therefrom by stripping off one of the reinforcing members. A face of the sintered metal lamina is exposed thereby.

The invention will be understood more fully through reference to the drawing and the accompanying description thereof.

Figure 1:
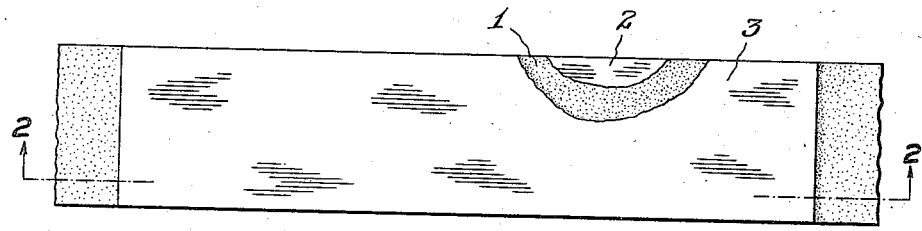
Fig. 1 is a fragmentary plan view showing part of a suitable brake strip assembly as provided for bending, parts thereof being broken away to show the construction.
Figure 2:
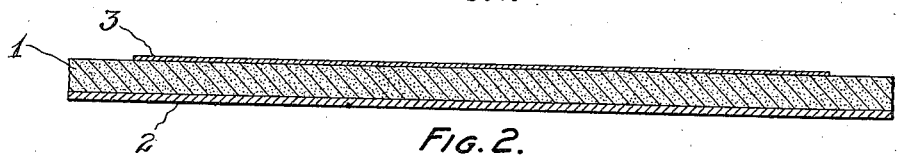
Fig. 2 is a sectional view taken along the line 2—2 of Fig. 1.
Figure 3:
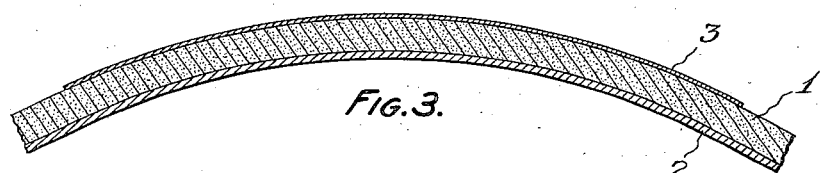
Fig. 3 is a sectional view taken similarly to Fig. 2 and showing the assembly after it has been bent to the desired shape.
Figure 5:
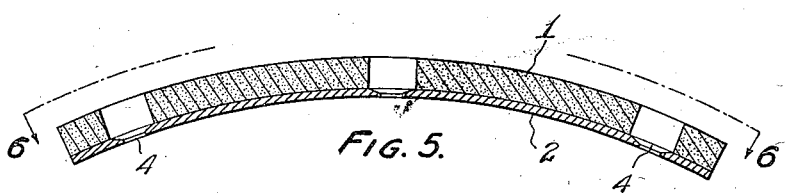
Fig. 5 is a sectional view taken similarly to Fig. 2 and showing the finished composite brake strip.
Figure 6:
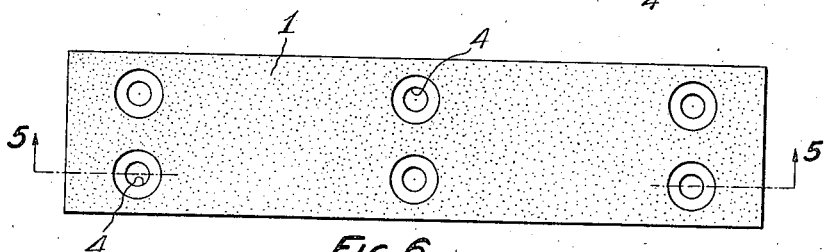
Fig. 6 is a plan view of the finished brake strip taken along the line 6—6 of Fig. 5.

In order to explain the invention more fully, the method will be illustrated by describing the manner in which it is performed in bending a composite brake strip of the type which is suitable for use on an internal expanding brake. It will be understood that the object of the invention, so far as this example is concerned, is to provide a bent or curved brake strip such as is shown in Figs. 5 and 6, the brake strip consisting of a sintered-metal friction layer 1 bonded to a suitable metallic reinforcing or backing member 2. Flat composite elements such as may be used in making such a brake strip are well-known, but as pointed out above, difficulty has been encountered in bending the flat elements without cracking the sintered material. Now according to the method, and for the purpose of avoiding the formation of cracks, a temporary reinforcing member, preferably of metal, is bonded to the sintered material at the face which will ultimately contact the brake drum. A fragment of such an assembly is shown in Figs. 1 and 2 wherein a sintered layer 1 is provided which has the thickness and other dimensions that are required in the finished article, the sintered layer being bonded to a permanent metal backing member 2, and to a temporary reinforcing member 3 which will subsequently be stripped from the assembly after the assembly has been bent. The reinforcing member 3 of course is bonded to that portion of the assembly which is to be bent or otherwise shaped.

A three-layer composite assembly such as is shown in Figs. 1 and 2 may be made in a number of different ways. Suitable methods are described in the United States patent application of Wellman and Sawyer, Serial No. 210,650 filed May 28, 1938, and in United States Patent No. 2,178,527 granted October 31, 1939, to S. K. Wellman. It will be understood, however, that the assembly may be made in other ways and that the method which is used in doing so is ancillary to the invention so long as the method which is used produces a relatively strong bond between the temporary reinforcing member 3 and the sintered material 1. It will be further understood that the temporary reinforcing member 3 and the permanent member 2 may be bonded to the friction material either in the same operation or in different operations, and that the friction material may be in either a sintered condition or in an unsintered condition when the bonding of either or both reinforcing members is effected.

After a suitable three-layer assembly has been provided, it may be bent to the desired shape by using any of the well-known methods for bending metallic materials. For example, the three-layer assembly may be passed through bending rolls of the usual and well-known construction or it may be bent by pressing it between forming dies or by forcing it into contact with the surface of a suitable forming member while it is supported resiliently either upon resilient material or upon flexible tension members such as chains, cable, and the like. Apparatus of the latter kind is shown in U. S. Patent No. 188,922 of March 27, 1877, and No. 484,264 of October 11, 1892. Since such shaping or bending apparatus forms no part of this invention and is already well-known, detailed description of it is omitted.

Figure 4:
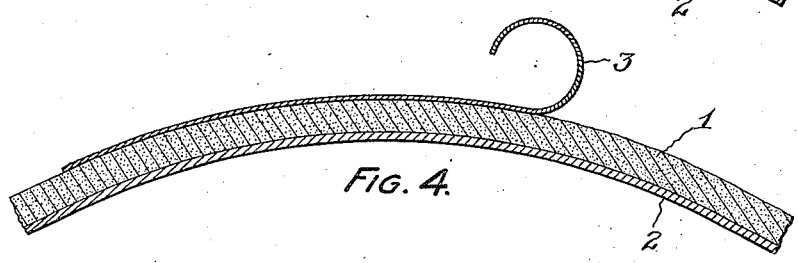
Fig. 4 is a sectional view taken similarly to Fig. 2 and illustrating the step of the method wherein the temporary reinforcing member is stripped from one surface of the sintered material.

After the article has been bent or suitably shaped, the temporary reinforcing member 3 is stripped from the surface of the sintered material 1. This step is illustrated in Fig. 4 wherein the temporary reinforcing member is shown to have been partially removed from the sintered material. The temporary member may be stripped by hand or by a suitable machine adapted to pull the reinforcing member away from the sintered material without destroying the latter. It should be pointed out in this connection that if a bond has been effected between the temporary reinforcing member and the sintered material in accordance with the Wellman patent supra (2,178,527), the bond will not be broken during the stripping step; instead, the temporary member will pull away a small amount of the sintered material when it is stripped from the bent assembly. Accordingly, the resulting surface of the sintered material is roughened to some extent. When the step is properly performed, however, the resulting surface may be easily restored to a smooth condition by subjecting it to a brief grinding or sanding operation. If the resulting two-layer composite article is inspected after having been smoothed in such manner, it will be found that no cracks appear in any of the bent or curved areas of the sintered material. It will also be found that the bond between the permanent backing member 2 and the sintered material shows no evidence of having been weakened by the bending operation. The strip accordingly is in merchantable condition and may be drilled or otherwise prepared for assembly upon the supporting brake shoe to which it is to be secured in use. Figs. 5 and 6 show the brake strip in its finished condition and provided with rivet holes 4.

It will be noted that the temporary reinforcing member 3 shown in the drawing is somewhat thinner than the permanent backing member 2. It has been found that this is generally the case even when the temporary member is disposed on the convex surface of the bent assembly. Tests have also shown that it rarely needs to be thicker than the permanent member, since greater thickness is required only when the sintered metal lamina is excessively thick. For sintered metal layers composed predominantly of copper and being up to about 3/8 inch in thickness, a temporary backing member of iron 1/16 inch thick will be found to provide adequate reinforcement to prevent cracking. For example, in bending a brake strip composed of an iron backing member 1/16 inch thick having bonded thereto a sintered copper layer 1/16 inch thick, tests have shown that the temporary reinforcing member composed of iron and having a thickness of .016 inch permits the assembly to be bent to a diameter of 12 inches when the sintered copper layer lies on the convex surface of the bent assembly. Temporary reinforcing members having thicknesses of .022", .031", .046" and .062" have also been tried on similar strips bent in the same manner to the same diameter, and in each case the temporary member has been found to prevent the development of cracks in the sintered material. Temporary reinforcing members .006" and .012" have also been tried similarly, but in each case the temporary member failed by breaking before the assembly had been bent to the required diameter.

It will be understood from the above example that a direct relationship exists between the required thickness of the temporary member and the degree of curvature which is to be imparted to the assembly, the thickness of the sintered metal layer therein, and the thickness of the permanent backing member, the required thickness increasing with an increase in any one of the latter variables. Furthermore, the required thickness varies with the nature of the sintered material and with the mechanical properties of the reinforcing member. In practicing the invention, however, it will be found that the proper thickness can be most readily determined experimentally by bending a series of assemblies such as described in the preceding example.

Those skilled in the art will recognize that this experimental method is more direct and eliminates the personal factors which so frequently vitiate conclusions derived from a mathematical formula such as might be established to express the above mentioned relationship.

Inasmuch as the invention may be practiced in various ways, and shaping may be done by bending, pressing, stamping, etc., the above examples and description should be regarded as illustrative, and the scope of the invention should be determined from the following claims.

What I claim is:

1. A method for making a curved body consisting of a curved layer of sintered metal and a similarly curved reinforcing member of stronger metal bonded thereto, said method comprising the steps of: providing a flat coherent plate-like body composed predominantly of compressed powdered metal; sintering said body and bonding it at its opposite faces to flat reinforcing sheets which are composed of dense metal and which are capable of preventing the surfaces to which they are bonded from undergoing any appreciable change in area when the assembly is bent, said bonding being effected by means of a bond which is substantially coextensive with the area common to the said sintered body and each of said reinforcing sheets, thereby forming a three-layer assembly in which the sintered body forms the middle layer and in which the reinforcing sheets are unrestrained against shifting relative to each other except by said intermediate body of sintered metal; curving said three-layer assembly to the desired arcuate form by bending it in a direction which places one of said reinforcing members at a greater distance from the center of curvature than the other; and thereafter stripping away the more remote reinforcing member to expose the convex surface of the sintered metal layer.

2. A method for avoiding the formation of cracks and other defects in a laminated plate-like body when bending the latter into arcuate form, said body being a flat reinforced sintered-metal assembly of the type wherein a relatively non-ductile lamina composed predominantly of powdered metal is bonded integrally to a permanent reinforcing plate of stronger metal, said method comprising the steps of: bonding the exposed surface of the sintered metal lamina of the assembly to a relatively thin temporary constraining plate of dense metal capable of preventing the sintered metal surface to which it is bonded from undergoing any substantial change in area when the assembly is bent, said constraining plate being bonded to the sintered layer by means of a bond which is substantially coextensive with the area common to both the said temporary plate and the said sintered metal lamina, thereby forming a three-ply assembly in which the sintered metal lamina forms the middle layer and in which the permanent and temporary reinforcing plates are unrestrained against shifting relative to each other except by said layer of sintered metal; bending the said three-ply assembly to the desired arcuate form by curving it in directions which place the temporary plate at a greater distance from the center of curvature than the permanent plate; and thereafter peeling away the said temporary member from the convex surface of the sintered metal lamina.

3. In the method of making an arcuately curved article having an unfractured sintered-metal lamina bonded to the convex face of a permanent reinforcing member of stronger metal, the steps of: providing a flat plate-like laminated assembly having a sintered-metal lamina bonded at one face to a permanent reinforcing member of metal which is stronger than the sintered metal, and bonded at its opposite face to a temporary reinforcing member of stronger metal, said members being bonded to the sintered-metal lamina by means of bonds which are substantially coextensive with the mutual areas of contact between said lamina and said permanent and temporary reinforcing members; curving said assembly to the desired convex arcuate form by bending it in a direction which places the temporary member at a greater distance from the center of curvature than is said permanent member; and thereafter removing the said temporary member to expose the convexly-curved face of the sintered-metal lamina.

4. In the method of making an arcuately-curved article having an unfractured lamina of sintered metal bonded to the convex surface of a reinforcing member of stronger metal, the steps of: providing a flat laminated assembly having a sintered-metal lamina bonded at both of its opposite faces to plate-like reinforcing members composed of metal which is stronger than the sintered metal, said bonding being effected by a bond which is substantially coextensive with the mutual areas of contact between said lamina and the reinforcing members; curving said assembly to the desired curvature by bending it in a direction which places one of the reinforcing members at a greater distance from the center of curvature than the other; and thereafter stripping away the more remote reinforcing member.

5. The method as claimed in claim 3 wherein the sintered lamina is composed predominantly of high melting point metal, and is bonded directly to the permanent and temporary reinforcing members.

6. The method as claimed in claim 3 wherein the sintered lamina is composed predominantly of copper and wherein the reinforcing members are composed of ferrous material.

7. The method as claimed in claim 4 wherein the sintered lamina is composed predominantly of copper.

8. The method as claimed in claim 4 wherein the sintered lamina is composed predominantly of copper and wherein the reinforcing members are composed of ferrous material.

9. A composite blank for use in making an arcuately-curved machine element of the type wherein a relatively non-ductile layer of sintered metal powders is bonded integrally to a reinforcing member of stronger metal, said article consisting of a three-layer assembly in which a plate-like sintered-metal body of the desired composition is bonded at one of its faces to a permanent metallic reinforcing member of stronger metal and at its opposite face to a temporary metallic reinforcing member of stronger metal by means of bonds which are substantially coextensive with the areas common to said reinforcing members and said sintered-metal body, said reinforcing members being capable of preventing the sintered-metal surfaces to which they are attached from undergoing any substantial change in area when the three-layer assembly is bent into the desired arcuate form.

SAMUEL K. WELLMAN.